INVENTOR.
HARALD ESCHOLZ
BY Rogers, Bereskin, & Parr

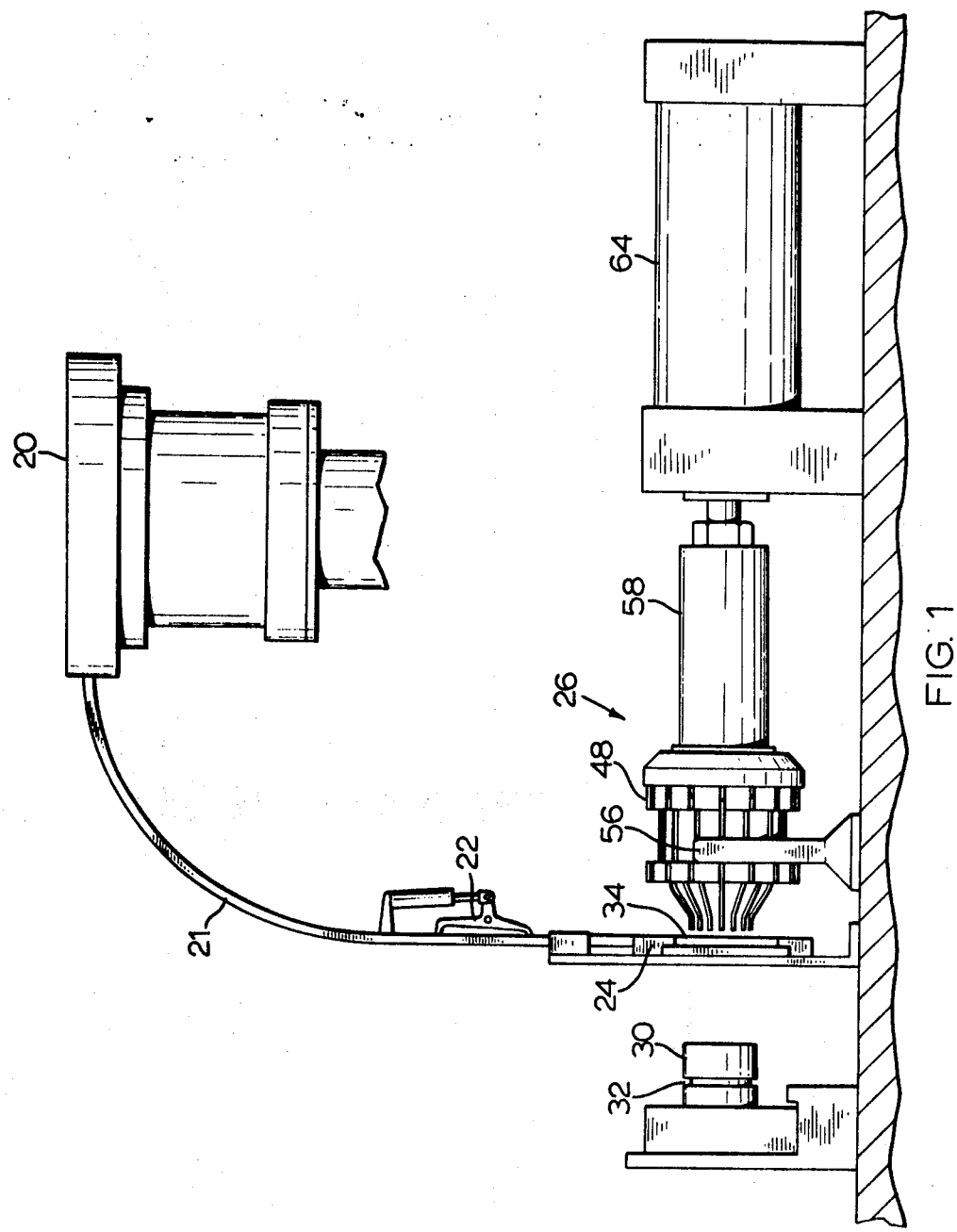

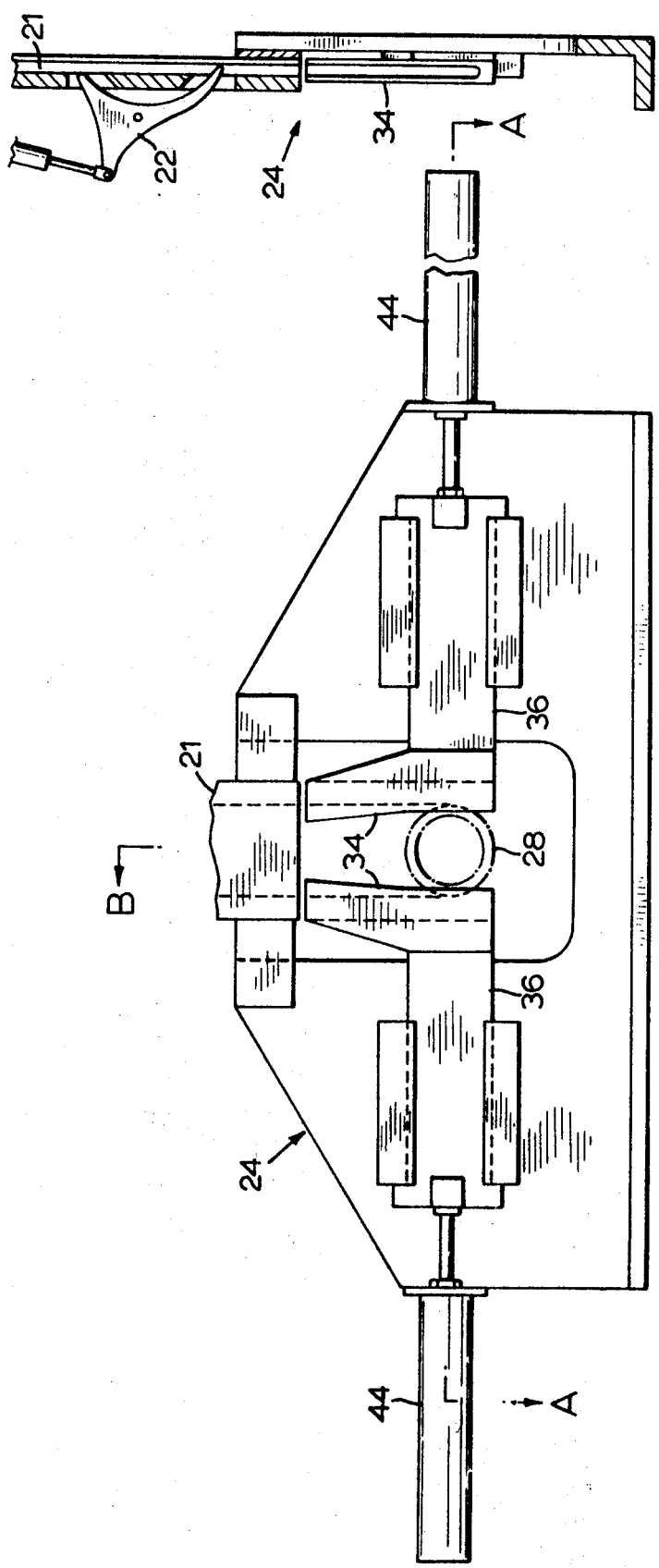

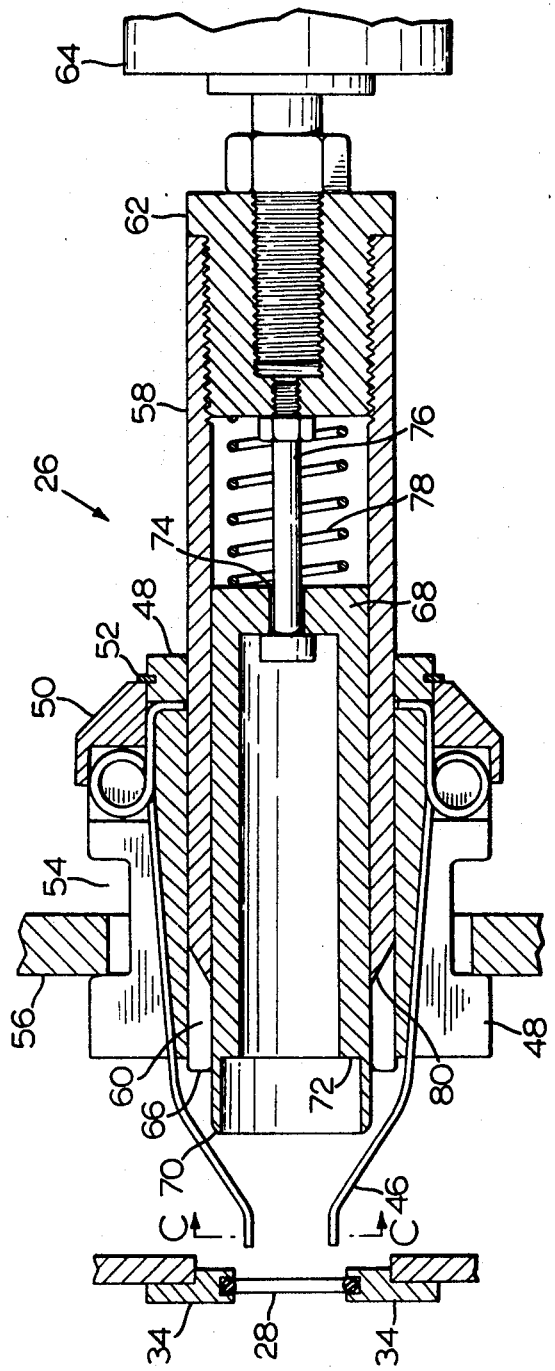
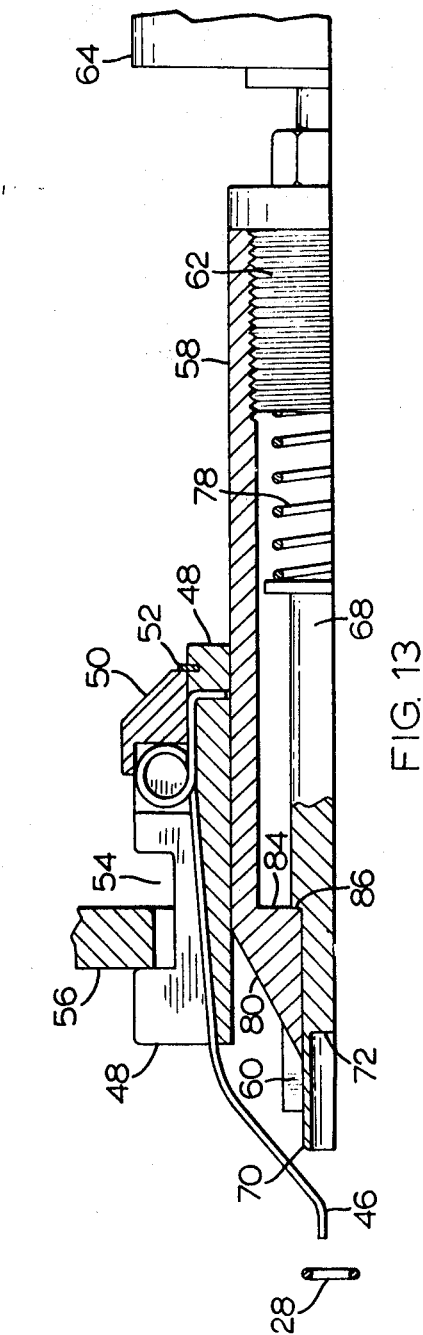
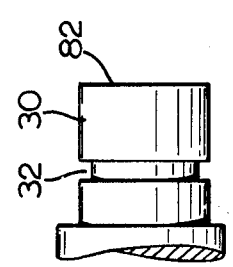

INVENTOR.
HARALD ESCHOLZ
BY
Rogers, Bereskin, & Parr

INVENTOR.
HARALD ESCHOLZ
BY Rogers, Bereskin, & Parr

United States Patent Office 3,605,239
Patented Sept. 20, 1971

3,605,239
APPARATUS FOR EXTERNAL INSTALLATION OF RESILIENT SEALS
Harald Eschholz, Islington, Ontario, Canada, assignor to Dick Gordon Rockwell, King, Ontario, Canada
Filed Jan. 16, 1970, Ser. No. 3,544
Claims priority, application Great Britain, Jan. 18, 1969, 3,008/69
Int. Cl. B23p 19/02, 19/04
U.S. Cl. 29—208C               11 Claims

ABSTRACT OF THE DISCLOSURE

An apparatus for automatically installing distensible annular components such as O-rings seals onto a shaft or the like. A feeding mechanism transports the seal to a positioning head where it remains until an applicator mechanism picks it up and stretches it. The seal is then transported over the shaft and once it is in position it is stripped automatically from the applicator mechanism whereupon the seal contracts about the shaft in the required position.

---

This invention relates to apparatus for automatically installing distensible, generally annular components such as resilient seals (O-rings, lip seals, and the like) onto members requiring a seal such as valve stems, door handle push buttons, etc.

Objects of the present invention are to provide an improved apparatus for automatically and rapidly installing such components without stretching them past their elastic limit and without twisting them.

According to one aspect, the invention comprises a feeding mechanism which automatically feeds distensible, generally annular components to a positioning head and an applicator mechanism which picks up each component and delivers it to a shaft or other member requiring a component. The applicator mechanism includes a set of movable fingers to remove each component from the feeding mechanism and expand it sufficiently to place it over the shaft; a sleeve to remove the component off the fingers and place it on a ram which takes the expanded component over the end of the shaft to a position adjacent its final position on the shaft; and means to force the component off the ram and into the final position on the shaft.

In drawings which illustrate embodiments of the invention,

FIG. 1 is a diagrammatic view of a preferred form of the invention;

FIG. 2(a) is a front view of a head for positioning the components;

FIG. 2(b) is a sectional plan view taken along the line A—A of FIG. 2(a);

FIG. 2(c) is a sectional side view taken along the line B—B of FIG. 2(a);

FIG. 3(a) is a sectional plan view through the centre line of an applicator mechanism;

FIG. 3(b) is a sectional end view taken along the line C—C of FIG. 3(a) through the applicator mechanism showing the layout of a set of fingers;

Figure 4A:
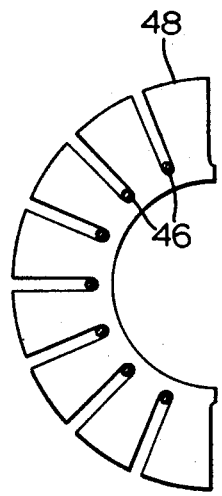
Figure 4B:
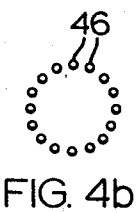
Figure 4C:
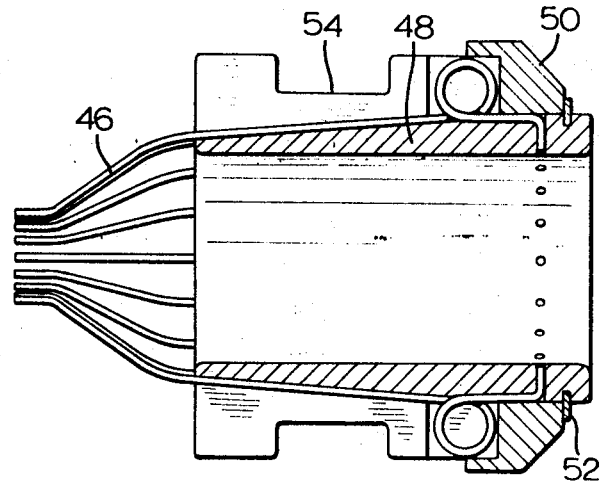
Figure 5A:
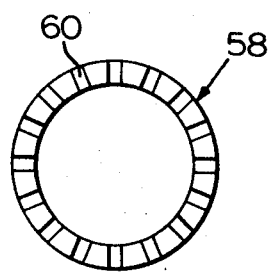
Figure 5B:
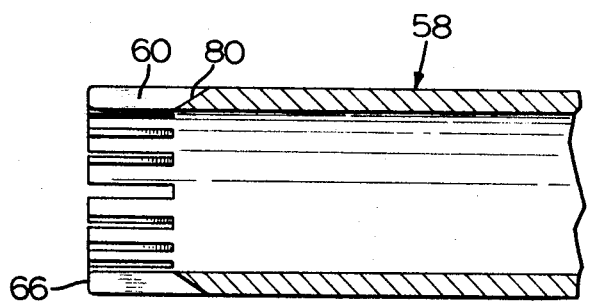
Figure 6A:
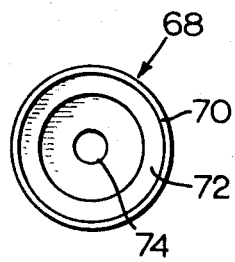
Figure 6B:
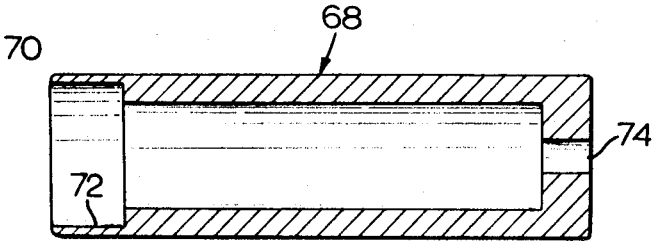
Figure 14:
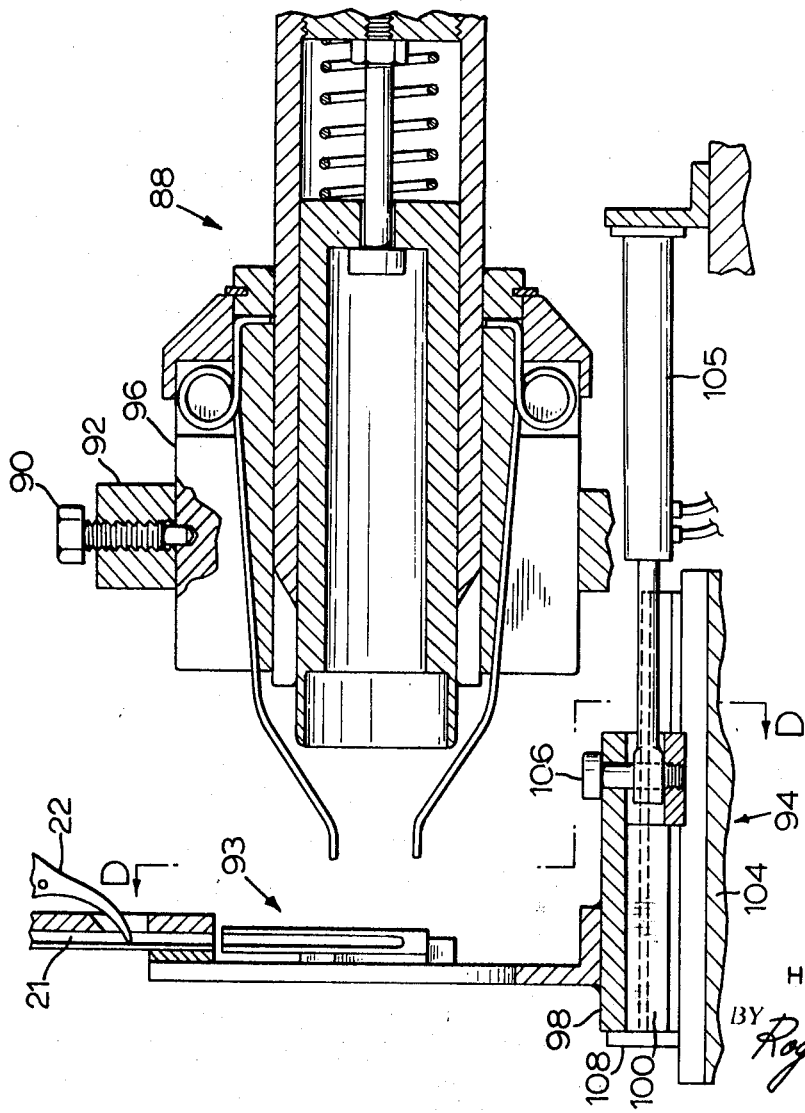

FIGS. 4(a), 4(b) and 4(c) are views illustrating in greater detail the fingers and associated mechanism shown in FIG. 3(a);

FIGS. 5(a) and 5(b) are views of a component releasing sleeve forming part of the applicator mechanism illustrated in FIG. 3(a);

FIGS. 6(a) and 6(b) are views of a ram forming part of the applicator mechanism illustrated in FIG. 3(a);

FIGS. 7 to 12 are simplified sectional plan views illustrating the sequence of steps used in placing a component on a shaft;

FIG. 13 is a half sectional plan view taken on the centre line of a second embodiment of the applicator mechanism;

FIG. 14 is a sectional side view of a further embodiment of the invention; and

Figure 15:
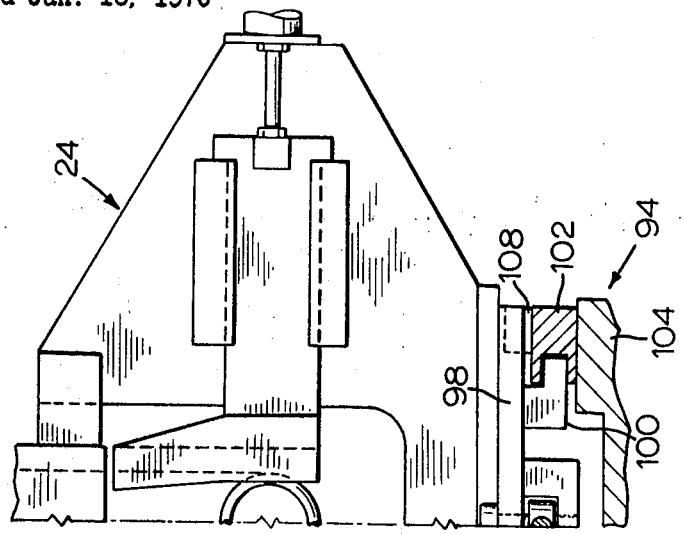

FIG. 15 is a half front view on lines D—D of FIG. 14.

The drawings will be described with reference to a seal as an example of distensible, generally annular components suitable for use with this invention.

Referring to FIG. 1, an improved automatic machine for installing seals and the like includes a conventional feeder 20 from which seals slide down a chute 21 and enter an escapement 22. The escapement 22 permits one seal at a time to enter a head 24 after every cycle of an applicator mechanism 26.

When a seal 28 is in position in the head 24, (as shown in FIG. 2(a)), the applicator mechanism 26 removes the seal from the head 24 and moves the seal 28 onto a shaft 30 and into a groove 32 on the shaft 30. The applicator mechanism 26 then returns to the starting position shown in FIG. 1 and is in condition for the next cycle.

Referring now to FIGS. 2(a), 2(b) and 2(c), which illustrate the head 24, a pair of grooved jaws 34 are carried in slide sets 36, and in their closed position shown in FIG. 2(a) the jaws are sufficiently spread apart so that seal 28 from the escapement 22 (FIG. 2(c)) can drop into the grooves in the jaws 34. The seal remains in this position until the applicator mechanism 26 (FIG. 1) enters the seal 28 and expands it. As the seal expands, the grooved jaws 34 open slightly, which causes cams 38 (FIG. 2(b)) to press against respective cam followers 40. Each cam follower 40 actuates a pilot valve 42 which causes actuating means 44 (e.g. pneumatic cylinders) to open the jaws 34 fully. The jaws 34 remain fully open until the applicator mechanism 26 has placed the seal 28 on the shaft 30 and has returned to its starting position. The actuating means 44 then returns the jaws 34 to their closed position to accept the next seal 28. The escapement 22 may be controlled by conventional means (not shown) responsive to the position of the applicator mechanism 26 so that the escapement 22 is actuated once during each cycle of operation. Thus when the applicator mechanism 26 returns to its starting position the jaws 34 close and the next seal 28 drops into the grooves in the jaws 34.

Reference is next made to FIGS. 3(a) and 6(b) with particular reference to FIG. 3(a). The applicator mechanism 26 includes a plurality of thin, elongated fingers 46 disposed about a slotted annular ring 48 (FIGS. 4(a) and 4(c)). The fingers 46 are spring-loaded and are held in a stressed position by a retaining ring 50, and the entire assembly is locked together by a spring circlip 52. The outer surface of the annular ring 48 is provided with a relatively wide annular groove 54, and a stop member 56, which is formed with a semi-circular upper edge, is positioned (FIG. 1) within the groove 54 so that it serves both to support the annular ring 48 and to limit its inward and outward travel.

A ram sleeve 58 having a plurality of equi-angularly spaced radial slots 50 (FIGS. 5(a) and 5(b)) is slidably positioned within the annular ring 48 and is sealed by a plug 62 which is adjustably attached to a double-acting cylinder 64. The ram sleeve 58 is best illustrated in FIGS. 5(a) and 5(b) where the radial slots 60 are shown in detail. The radial slots 60 accommodate the fingers 46 so that as the ram sleeve 58 initially advances inwardly inside the annular ring 48, the outer end 66 of the ram sleeve 58 does not at first engage the fingers 46. However, when the ram sleeve 58 has advanced sufficiently towards the shaft 30 (upon which the seal is to be installed) the root of the slots 60 engages and spreads the fingers 46 radially outwards.

A ram 68 is slidably positioned within the ram sleeve 58 and is concentric with the ram sleeve 58 and the annular ring 48. The ram 68 is best illustrated in FIGS. 6(a) and 6(b) and it has an outer end 70, a recess 72 formed in the outer end 70 of the ram 68, and an opening 74 for receiving a locating screw 76 (see FIG. 3(a)). The recess 72 is dimensioned so that the outer end 70 of the ram 68 can travel over the outer end of the shaft 30 onto which the seal 28 is to be fitted until the end of the shaft 30 abuts against the floor of the recess 72. A spring 78 biasses the ram 68 outwards so that it is normally held against the head of the locating screw 76.

The annular ring 48 and its associated parts as shown in FIG. 4(c) form a first sub-assembly and the ram 68 and ram sleeve 58 form a second sub-assembly. The relative position of these sub-assemblies is fixed by threading the second sub-assembly on to the double acting cylinder 64 and setting the position of the stop member 56 about the first sub-assembly to produce the application mechanism 26 illustrated in FIG. 3(a).

Figure 7:
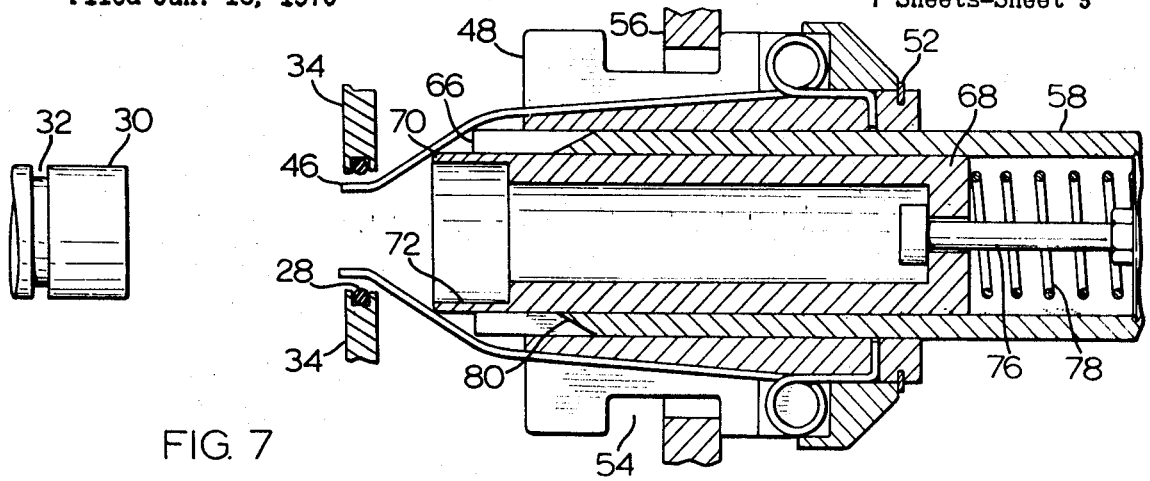
Figure 8:
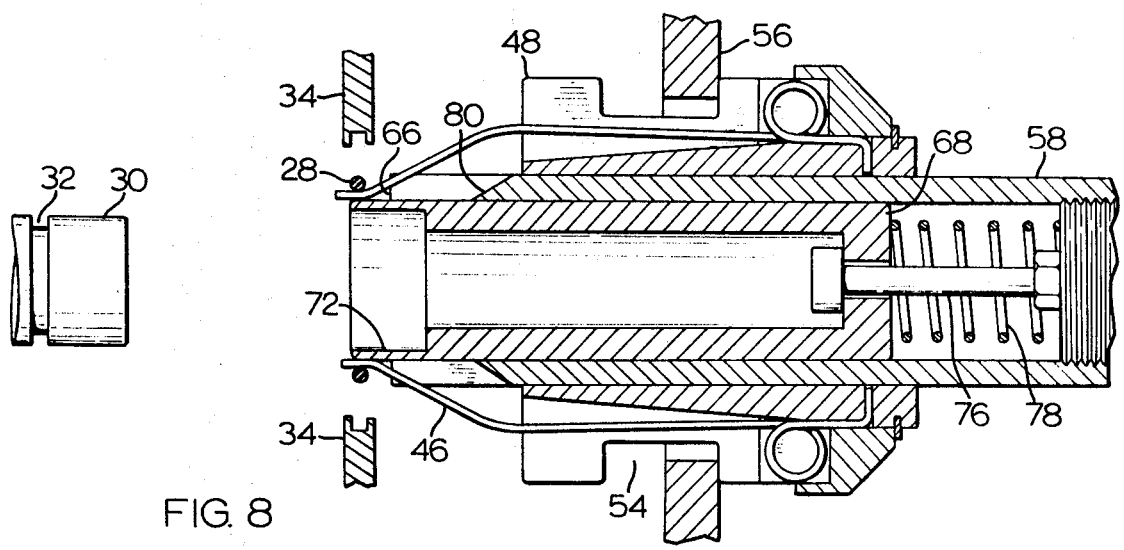
Figure 9:
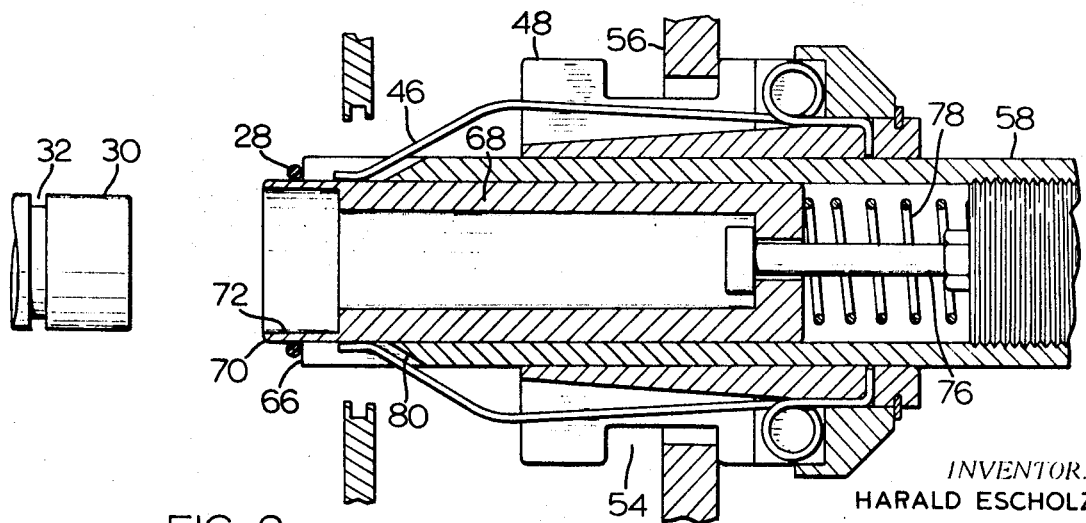
Figure 10:
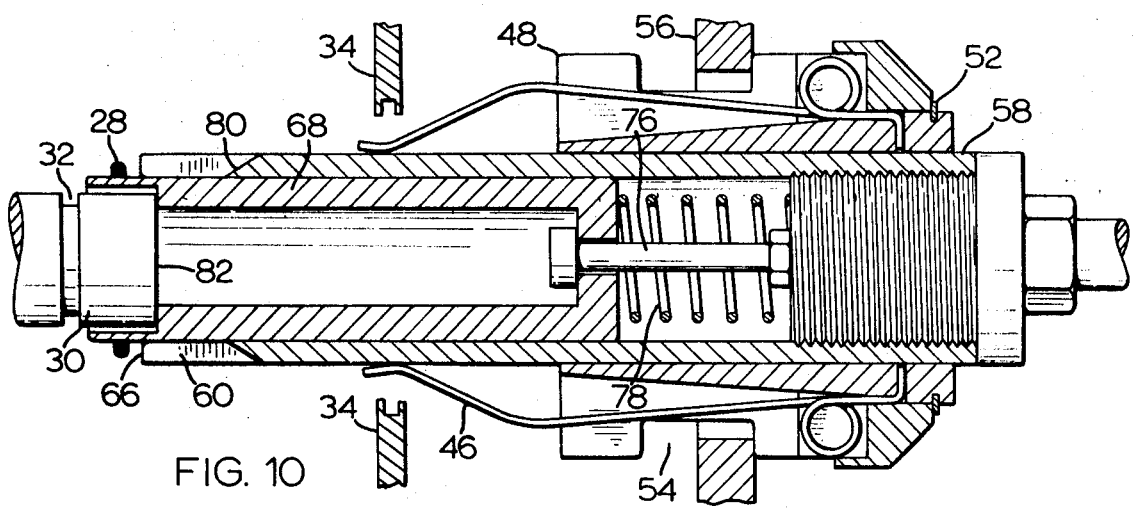
Figure 11:
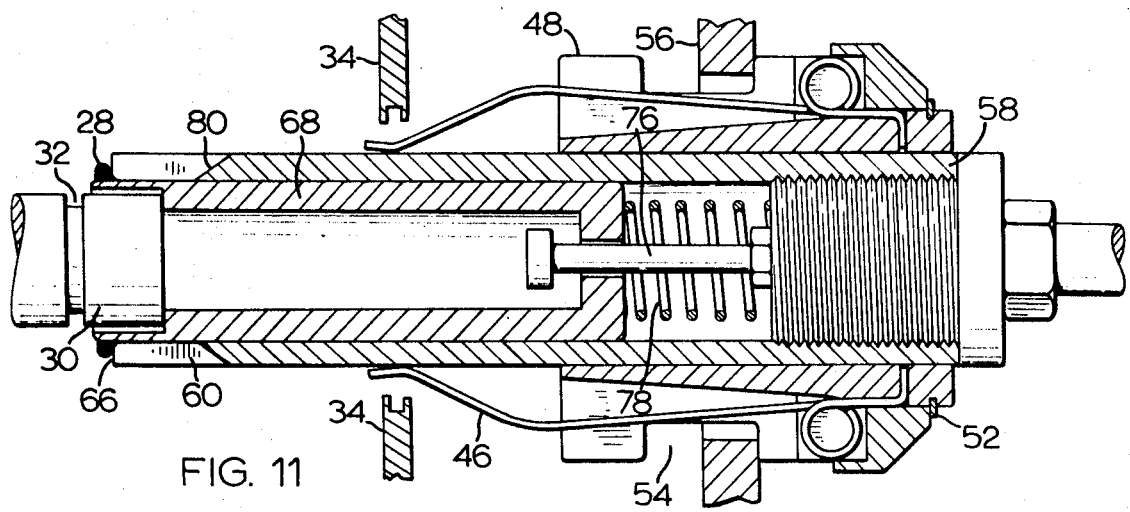
Figure 12:
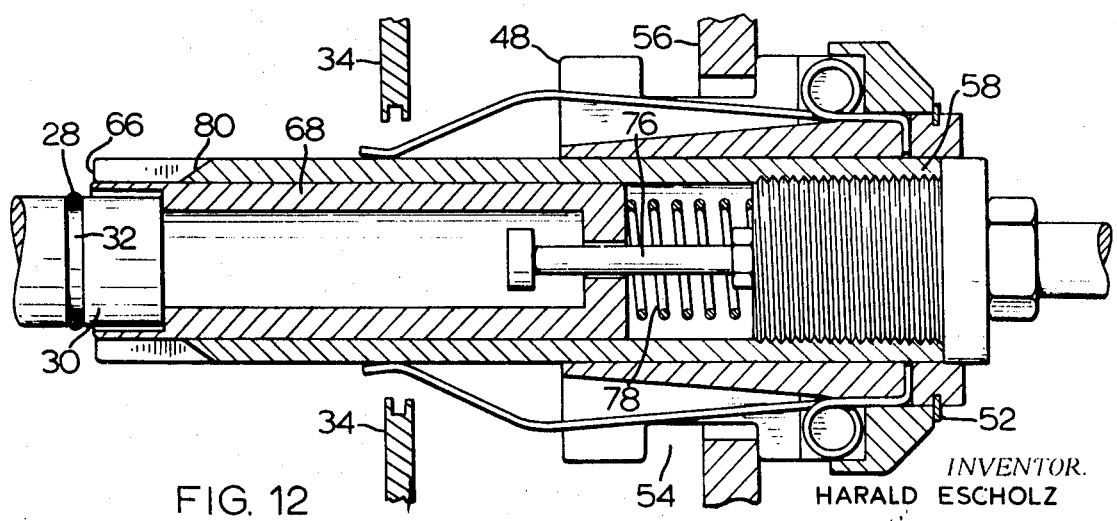

The operation of the applicator mechanism 26 is illustrated by the sequence drawings FIGS. 7–12. In FIG. 7 the annular ring 48 has been advanced to its outward limit of travel by the cylinder 64 and it abuts against the stop member 56. In this position the ends of the fingers 40 are within the seal 28. The cylinder 64 continues to move outwardly and although the annular ring 48 and its associated structure is held stationary by the stop member 56, the ram 68 and ram sleeve 58 begin to move outwardly as a unit. The outer end 70 of the ram 68 engages and expands the fingers 46, the pilot valve 42 (FIG. 2(b)) is actuated, and the jaws 34 are thereby opened (FIG. 8). The ram 68 and sleeve 58 continue to move outwardly until the outer end 66 of the sleeve 58 pushes the seal 28 off the fingers 46 onto the ram 68 and into the position shown in FIG. 9. The roots 80 of the slots 60 lift the fingers 46 clear of the ram 68 and then the outer end of the shaft 30 (on which the seal is to be installed) is received within the recess 72 in the outer end of the ram 68 (FIG. 10). The only member now free to continue further outward motion is the ram sleeve 58, which moves outwardly until it re-engages the seal 28, as shown in FIG. 11. The seal 28 is thereby pushed off the ram into the groove 32 of the shaft 30 where it contracts to fit tightly in the groove.

The cylinder 64 then reverses its direction. The action of the spring 78 urges the ram 68 against the head of the locating screw 76, and the annular ring 48 moves back against the front face of the stop 56. When this operation is completed, the jaws 34 (FIG. 2(b)) close and another seal 28 falls into place ready for the next cycle.

The apparatus is intended mainly for applying seals to shafts but it may also be used for installing any generally annular distensible object which has sufficient elasticity to allow it to return to its desired shape after it has been expanded slightly. The shape of the object will dictate the shape of the applicator mechanism and the relationship between the fingers.

The apparatus can accommodate shaft 30 having the groove 32 at different distances from the end of the shaft 82 by using a deeper recess 72 in the ram 68 and a series of rings or plugs of different lengths which can be inserted into the recess 72 to effectively vary the depth of the recess 72 as required to suit the particular shaft 30.

The applicator mechanism 26 is designed to apply seals within a small range of diameters. Other sizes of seals can easily be accommodated, however, by providing a variety of applicator mechanisms 26 of various sizes, and interchanging the applicator mechanism 26 as required.

FIG. 13 illustrates an alternative way of limiting the movement between the ram 68 and the ram sleeve 58. An internal shoulder 84 on the ram sleeve 58 abuts against an external shoulder 86 on the ram 68 under the influence of the spring 78. This embodiment shown in FIG. 13 is more readily adapted to the use of plugs to vary the effective position of the recess 72 as previously described, since the shoulder 86 results in a thicker wall and gives a long ram more rigidity.

Reference is now made to FIGS. 14 and 15 with particular reference to FIG. 14. In this embodiment an actuator mechanism 88 is rigidly attached by a fitted screw 90 to a stand 92 and a head 93 is mounted on a slide 94 for reciprocal movement to place a seal on the mechanism 88. The mechanism is identical with mechanism 26 (FIG. 3(a)) but for an annular ring 96 which is cylindrical on its outer face to locate in the stand 92. Also head 93 differs from head 24 (FIG. 2(c)) in that the head 93 is mounted on a base place 98 which is coupled on its underside to a pair of spaced-apart sliders 100 each of which co-operates with a track member 102 attached to a bedplate 104. The head 93 is moved along the slide 94 by an actuator 105 which is coupled by bolt 106 to the baseplate 98 and which is preferably of the hydraulic type. Stops 108 at the outer end of the slide track members 100 limit the outer movement of the head 93.

In use, the applicator mechanism 88 remains stationary until the head 93 has carried a seal onto the fingers of the mechanism 88. The mechanism is then actuated to spread the fingers to grip the ring while the head 93 withdraws to permit the mechanism 88 to continue its outward motion to place the seal on a component as previously described. The mechanism 88 then withdraws and a new seal enters the head 93 to start a new cycle.

The chute 21 must either be sufficiently resilient to allow the reciprocal movement of the head 93 or the chute must be broken, adjacent the head 93 such that the chute and head 93 are in position to place a seal in the head when the baseplate is against the stop 108.

I claim:
1. Apparatus for placing a distensible annular component at a predetermined position about a workpiece, said apparatus having a longitudinal axis and comprising:
   (a) means for sequentially positioning said components transversely of said axis,
   (b) applicator means operable to move longitudinally to sequentially position said components on said workpiece, said applicator means comprising:
      (i) fingers having ends which are adapted to engage said components,
      (ii) a ram operable to spread said finger ends radially outwards to thereby expand said components; and
      (iii) release means longitudinally reciprocable relative to said ram for stripping said component off said finger ends and onto said ram, and including means for moving said component off said ram and onto said workpiece at said predetermined position;
   (c) actuator means for varying the longitudinal separation of said positioning means and said applicator means between predetermined limits to position said finger ends within said component preparatory to expanding said component, and including means for varying the longitudinal separation of said applicator means and said workpiece between predetermined limits to position said component on said workpiece and to strip said component off said applicator means.

2. Apparatus as claimed in claim 1 wherein said release means further comprises a sleeve reciprocally journalled on said ram for longitudinal movement relative to said ram between a withdrawn position for stripping said component off said finger ends, and an advanced position for stripping said component off said ram.

3. Apparatus as claimed in claim 2 wherein said applicator means further comprises means resiliently biassing said sleeve toward said withdrawn position, and wherein said workpiece includes an end face intermediate said predetermined position and said applicator means so that as said actuator means brings together said applicator means and said workpiece, said ram engages said end face and said sleeve moves into said advanced position to strip said component off said ram.

4. Apparatus as claimed in claim 3 wherein said positioning means and said workpiece are fixed longitudinally, and wherein said actuator means moves said applicator means longitudinally to pick up said component off said positioning means and to position said component on said workpiece at said predetermined position.

5. Apparatus as claimed in claim 3 wherein said workpiece is fixed longitudinally and said actuator means moves said positioning means to place said annular component over said finger ends, and wherein said actuator means moves said applicator means longitudinally to place said component about said workpiece in said predetermined position.

6. Apparatus as claimed in claim 4 wherein said workpiece includes a generally cylindrical portion between said end face and said predetermined position, and wherein said ram has a diameter slightly larger than the diameter of said cylindrical portion, said ram comprising an outer end having an axial cylindrical recess adapted to receive said cylindrical portion such that upon stripping said component off said ram, said component frictionally engages said workpiece at said predetermined position.

7. Apparatus as claimed in claim 6 wherein said sleeve is tubular and is slidably engaged about said ram for longitudinal motion relative to said ram, said sleeve comprising a leading end defining a plurality of longitudinal slots for receiving said finger ends, in contact with said ram so that movement of said sleeve relative to said finger strips said component off said finger ends and positions said component on said ram.

8. Apparatus as claimed in claim 7 wherein said positioning means comprises:

(a) a pair of opposed jaws, said jaws being spaced apart about said axis for locating said component substantially concentrically about said axis;

(b) guide means coupled to said jaws for guiding said jaws transversely of said axis between an inner position for receiving and positioning a component and an outer position wherein said jaws are withdrawn to permit free longitudinal movement of said applicator means past said positioning means; and (c) means responsive to the position of said applicator means for moving said jaws between said inner and outer positions.

9. Apparatus as claimed in claim 8 wherein each said jaws has an inner face, said inner faces being spaced-apart and substantially parallel and each said inner face having a shallow groove for receiving and positioning a component.

10. Apparatus as claimed in claim 9 wherein said apparatus further comprises: a chute for guiding said components into said grooves; an escapement coupled to said chute for controlling the flow of said components into said grooves; and means for opening said escapement to permit a component to enter said grooves, said opening means being responsive to the position of said applicator means.

11. Apparatus as claimed in claim 10 wherein said actuator means and said moving means are controlled hydraulically.

References Cited

UNITED STATES PATENTS

| 3,289,286 | 12/1966 | Belanger | 29—235 |
| 3,455,011 | 7/1969 | Harding | 29—235 |

THOMAS H. EAGER, Primary Examiner

U.S. Cl. X.R.

29—211D, 235